W. W. KILPATRICK.
FLEXIBLE METALLIC PIPE COUPLING.
APPLICATION FILED AUG. 12, 1908.
927,659.
Patented July 13, 1909.
2 SHEETS—SHEET 1.
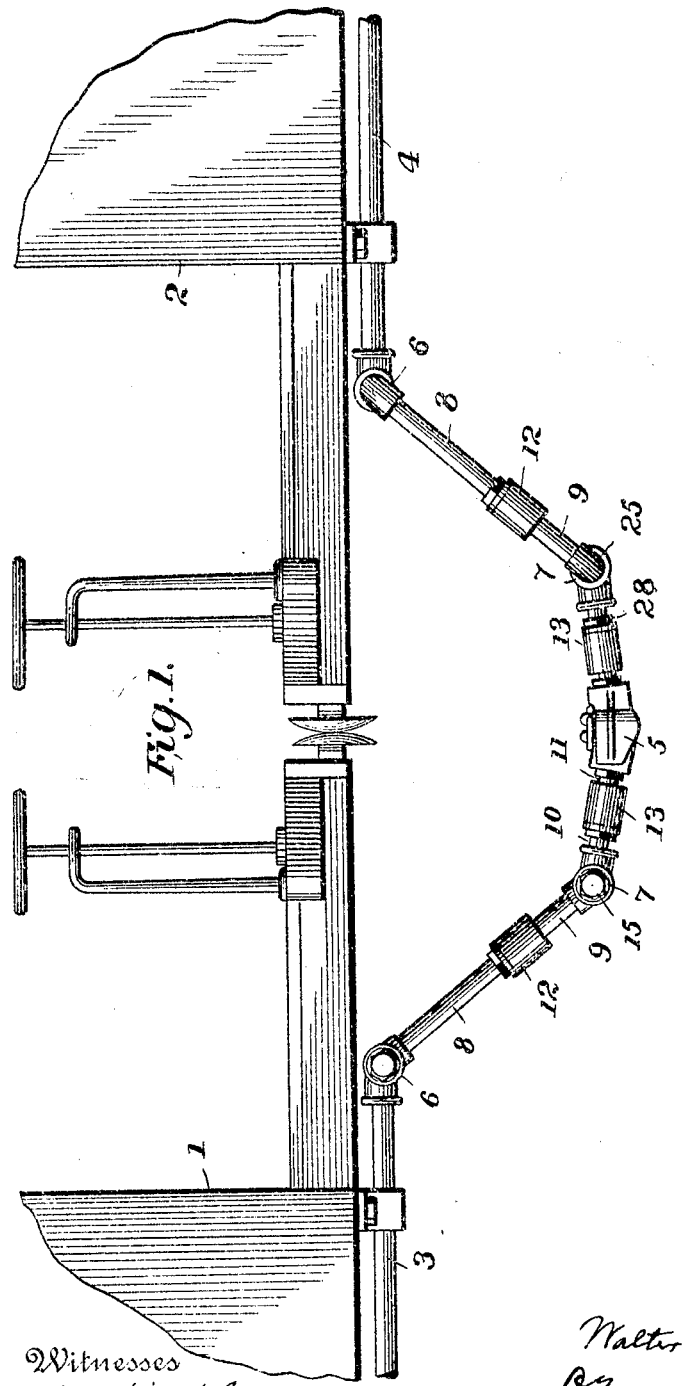
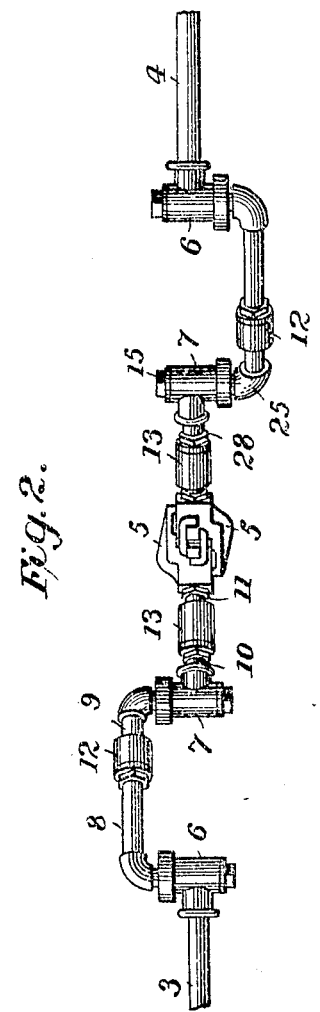
Witnesses
J. G. Hinkel
B. C. Rust
Inventor
Walter W. Kilpatrick
By
Foster, Freeman, Watson & Coit
Attorneys

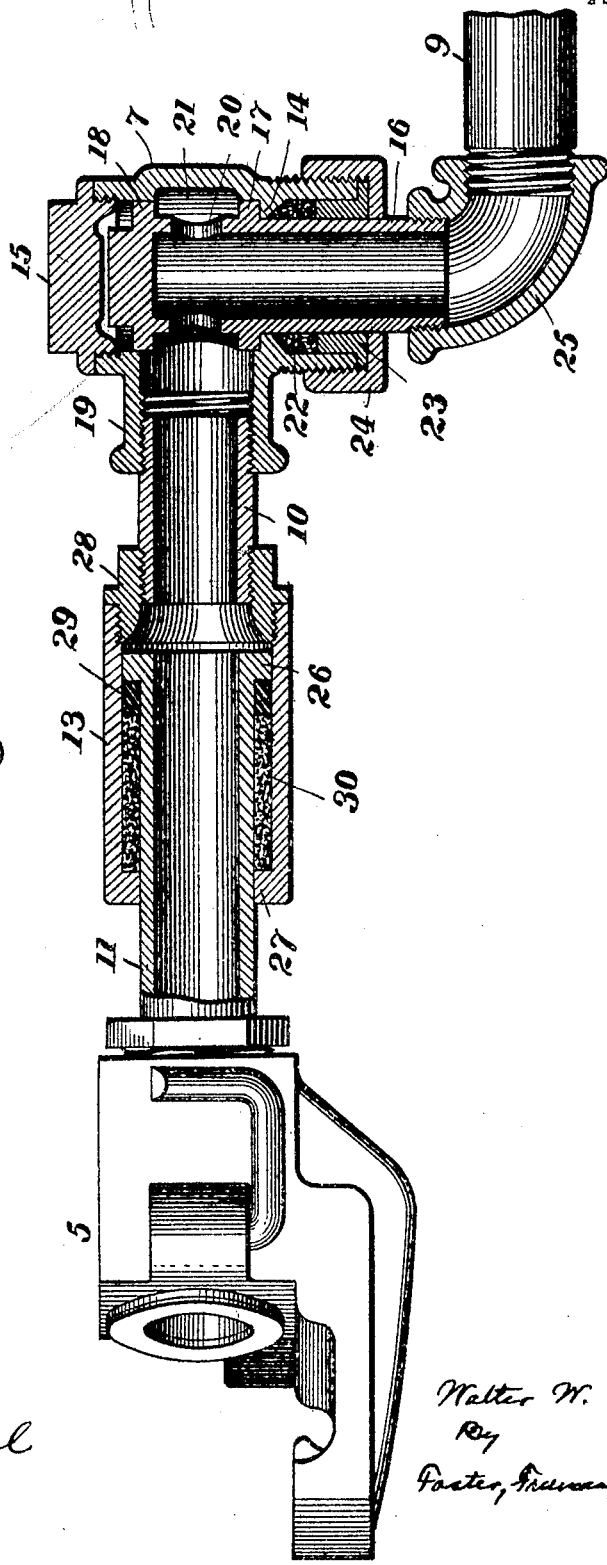

UNITED STATES PATENT OFFICE.

WALTER W. KILPATRICK, OF ATLANTA, GEORGIA, ASSIGNOR TO AIR-BRAKE AND STEAM-HEAT CONNECTION COMPANY, OF ATLANTA, GEORGIA.

FLEXIBLE METALLIC PIPE-COUPLING.

No. 927,659.   Specification of Letters Patent.   Patented July 13, 1909.

Application filed August 12, 1908. Serial No. 448,196.

*To all whom it may concern:*

Be it known that I, WALTER W. KILPATRICK, a citizen of the United States, residing at Atlanta, in the county of Fulton and State of Georgia, have invented certain new and useful Improvements in Flexible Metallic Pipe-Couplings, of which the following is a specification.

This invention relates to flexible metallic pipe couplings designed primarily to connect the pipes of adjacent cars of a railway train but which is also adapted for other uses. Its objects are to improve the construction of such couplings so as to secure greater flexibility and greater durability and at the same time to prevent leakage of the coupling under the severe conditions of practical use.

To these ends the invention consists in the novel features of construction which will be clear upon consideration of the following description taken in connection with the accompanying drawings.

In the drawings, Figure 1 represents the ends of two adjacent cars having my coupling joining the pipes thereof; Fig. 2 is a plan view of the coupling as shown in Fig. 1; and Fig. 3 is a detail sectional view of a portion of my coupling showing my novel means for securing the results above indicated.

In the drawings 1 and 2 represent the adjacent ends of two cars carrying the train pipes 3 and 4. My improved coupling constitutes a flexible connection between the ends of the pipes 3 and 4. It is made up of two similar sections each carrying upon its end an ordinary coupling head 5, and since the sections are the same in all particulars it is only necessary to describe one in detail.

The coupling head 5 is connected with the pipe 3 by the metallic parts made up of the port-joints 6, 7, the metal pipes 8, 9, 10 and 11 and the swivel connections 12 and 13. It will be observed that the port-joints are at an angle to the line of the pipes and in this instance they are shown at right angles, thus furnishing a pivot joint which permits the pipe 8 to turn into any position in a plane parallel to a plane including the pipe 3. The pipes 8 and 9 are in line and the swivel connection 12 between them permits one of these pipes to rotate in reference to the other thereby changing the relative positions of the port-joints 6 and 7. The swivel connection 13 between the pipes 10 and 11 is similar to the connection 12 and operates in the same way. The port-joint 7 is furthermore like the joint 6 and permits the pipe 9 to turn into various positions in a plane parallel to a plane passing through the pipe 10. These port-joints and swivel connections furnish a flexible connection between the pipe 3 and the coupling head 5 which permits the coupling head to be moved into the desired position for coupling.

In actual practice great difficulty has been experienced in connection with the manufacture and use of flexible metallic couplings since it has heretofore seemed impossible to make such couplings having the requisite amount of flexibility which will not leak. The difficulty I believe to have been due to the kind of joints used and the arrangement of the joints, and in the present invention I have devised the joints to successfully overcome the defects above mentioned. I believe that one of the main things which make my coupling steam-tight under the severe conditions of practical use resides in the port-joint which I use and which permits slight relative movement of the parts without affecting in any way the packing joint which secures the steam-tight effect.

It will be seen by reference to Fig. 3 that the pipe 10 has secured to one end thereof a casing 7 constituting a part of the port-joint. This casing 7 has a transverse passage therethrough which is substantially cylindrical in shape and may be of two diameters connected by the inwardly projecting wall of the internal circumferential rib 14. The outer end of this cylindrical passage is adapted to be closed by a screw cap 15 which makes steam-tight connection with the casing 7 and for this purpose it will be understood that packing may be used. Fitting within the cylindrical passage is a short pipe 16 which I preferably make closed at its inner end and which is made at its outer end of such diameter as to fit the smaller bore of the passage. This pipe 16 is provided with circumferential flanges 17, 18 which fit the larger bore of the cylindrical opening and which are upon opposite sides of the outlet connection 19. Between these flanges the tube 16 is provided with openings 20 which lead into an enlargement 21 in the casing 7 surrounding the tube 16 and thus the interior of the tube 16 is at all times in communication with the outlet 19 without regard to the position in which this tube 16 may be turned. Packing 22 is placed in the casing 7 around the tube 16 and against the rib 14 and it is held in place by a metal ring 23 which is in turn forced in position by the screw cap 24 fitting over the open end of the casing 7. It will be observed by this construction that the tube 16 may have a slight longitudinal movement within the casing 7 without affecting in any way the steam-tight connection produced by the packing 22 at one side of the casing and without affecting in any way the steam-tight connection produced by the cap 15 at the other end of the casing. Where it has been attempted to produce a steam-tight joint in a device of this kind by a packing bearing against the end of some portion of the movable parts constituting the joint there will be a leakage in the joint after short usage. This is due to the strains to which the parts are subjected which tend to compress or loosen the joints and to thus cause leakage. By my packing joint bearing at right angles upon the smooth cylindrical outer surface of the tube 16 the effect of these strains upon the packing joint is avoided and a flexibility is given to the joint which assists materially in the management of the coupling. I believe that this feature of permitting the parts of the joint to have relative longitudinal movement as well as rotary movement without affecting in any way the packing which produces the steam-tight effect is one of the essential features making the coupling a success. It will be understood that the tube 16 will be inserted in the cylindrical bore of the casing 7 through the open larger end and that the screw cap 15 will then be applied to close the opening. The outer end of the tube 16, which extends beyond the casing, is connected to the pipe 9 by any suitable means and in this instance I have shown a screw-threaded coupling 25 which connects with the pipe 9 at right angles to the tube 16.

It will be understood that the port-joint 6 is exactly like the port-joint 7 just described, and that the pipe 3 in this instance is the inlet pipe for the port-joint corresponding to the outlet pipe 10 shown in Fig. 3.

The swivel joints 12 and 13 are constructed as shown in Fig. 3 and it will be seen by reference to this figure that the pipe 11 is provided with a circumferential flange 26 upon its end and that the casing 13 surrounds this pipe, having an interior flange 27 fitting the pipe closely. A metal ring or gland 29, which I preferably make of brass, fits around pipe 11 against flange 26 within the casing 13. Packing 30 is preferably placed around the pipe 11 and is held between gland 29 and flange 27. In the outer open end of the casing 13 a screw plug 28 is placed, making connection with the pipe 10 and thus rigidly connecting the casing 13 with the pipe 10. By my construction a steam-tight rotary connection is made between pipes 10 and 11 and it is of such a character that the strains of practical use will not make it leak.

It will be understood that modifications may be made in the details without departing from the spirit of my invention and therefore without limiting myself to precisely what is shown what I claim is:

1. A joint for metallic pipe connections comprising a casing having a substantially cylindrical opening therethrough closed at one end and an inlet pipe connection at one side, a pipe connection having an end portion at an angle extending into the open end of said casing and communicating with the inlet, the said connection having lateral bearing connection with said casing upon opposite sides of said inlet, means for securing said end portion against withdrawal from said casing, and packing within said casing near the open end thereof bearing laterally upon said end portion and being held independently of longitudinal motion of said portion.

2. A joint for metallic pipe connections comprising a casing having a cylindrical opening therethrough of two diameters, an inlet pipe connection leading into the side of the larger portion of the opening, a closure for the large end of said opening, a tube fitting the small portion of said opening and having ribs fitting the large portion thereof thus furnishing bearings upon opposite sides of the inlet connection and being provided with lateral ports communicating at all times with the said inlet pipe connection, and packing within said casing near the open end thereof bearing laterally upon said tube and being held independently of longitudinal motion of said portion.

3. A joint for metallic pipe connections comprising a casing having a substantially cylindrical opening therethrough provided with an interior rib and with a lateral inlet on one side of said rib, a cap making a steam-tight closure for one end of said opening, a short tube fitting said opening and extending beyond the other end thereof provided with ports adapted to communicate at all times with the said inlet and having an exterior rib engaging the rib in said opening, rotary bearings between said short tubes and casing on both sides of said inlet, a packing ring in the open end of said casing surrounding said tube adjacent said interior rib, and a sleeve for holding said packing in place and pressing it against said rib.

4. A joint for metallic pipe connections comprising a casing having a cylindrical opening therethrough of two diameters, an inlet pipe connection leading into the side of the larger portion of the opening, a closure for the large end of said opening, a tube having a closed inner end fitting the small diameter of said opening and having two circumferential ribs fitting the large diameter of the opening upon opposite sides of the inlet, the said tube being provided with lateral openings between said ribs, and a packing in the smaller diameter of the opening bearing upon the side of the tube and held in place by a sleeve independently of the tube.

5. The combination with two metallic pipe sections of a port-joint pivotally connecting the ends of said sections comprising a casing upon the end of one section having a bearing opening at an angle to said section, a portion carried by the other section at an angle thereto extending into said bearing opening, separated metallic bearing connection between said parts within said casing, and steam-tight rotary connection between said portion and casing permitting slight longitudinal motion of the portion within the bearing without affecting the steam-tight connection.

6. In a flexible metallic pipe connection the combination with the main pipe of a coupling head, metallic pipe connection between said main pipe and coupling head embodying a single line of pipe having transverse steam-tight port-joints so constructed as to form pivots with separated bearings and to permit slight relative lateral movement of the connected parts without affecting the steam-tight connection, and swivel joints in said pipe connection permitting relative rotation of the parts.

7. In a flexible metallic pipe connection embodying a single line of pipe the combination with the main pipe of a coupling head, metallic pipe connection between said main pipe and coupling head embodying two transverse steam-tight port-joints so constructed as to form pivots with separated bearings and to permit slight relative lateral movement of the connected parts, a pipe connecting said joints having laterally extending portions forming parts of said joints, the said pipe being provided between its ends with a swivel, and a pipe connecting one of said joints with the coupling head.

8. In a flexible metallic pipe connection, the combination with the main pipe, of a coupling head, a single metallic pipe connection between said main pipe and coupling head formed in sections, a swivel joint in each section permitting relative rotation of the parts, transverse port-joints connecting said sections having separated metallic bearing surfaces, a steam-tight packing bearing laterally upon the pipe connection within said joints, the parts being so disposed as to permit slight relative longitudinal movement on said metallic bearings, and means for holding said packing in place to make a tight joint independently of the said relative movement.

9. A joint for metallic pipe connections comprising a casing having a substantially cylindrical opening therethrough and an inlet the said connection having lateral bearnection having an end portion at an angle extending into said casing and having a lateral opening communicating with the inlet the said connection having lateral bearing connection with said casing upon opposite sides of said inlet, means for securing said end portion against withdrawal from said casing, and packing within said casing near the end thereof bearing laterally upon said end portion and being held independently of longitudinal motion of said portion.

10. In metallic pipe connections, the combination with a casing having a substantially cylindrical opening therethrough closed at one end and an opening constituting a pipe connection at one side, of a pipe having an end portion at an angle extending into the open end of said casing and past the side opening therein, metallic bearing connection between said end portion and casing upon opposite sides of said side opening, means for permitting slight longitudinal motion of said end portion within the casing, and packing within said casing near the open end thereof bearing laterally upon said end portion and being held independently of longitudinal motion of said end portion.

11. A joint for metallic pipe connections comprising a casing having a substantially cylindrical opening therethrough closed at one end and having a side inlet, a pipe having side openings extending into said opening past said inlet, circumferential bearing flanges on said pipe upon opposite sides of said inlet, packing within said casing near the open end thereof bearing laterally upon said pipe, an end ring holding said packing in place and furnishing a bearing for said pipe, and means for permitting a slight longitudinal movement of said pipe.

In testimony whereof I affix my signature in presence of two witnesses.

WALTER W. KILPATRICK.

Witnesses:
 A. D. SMITH,
 B. HARVEY HILL.